UNITED STATES PATENT OFFICE.

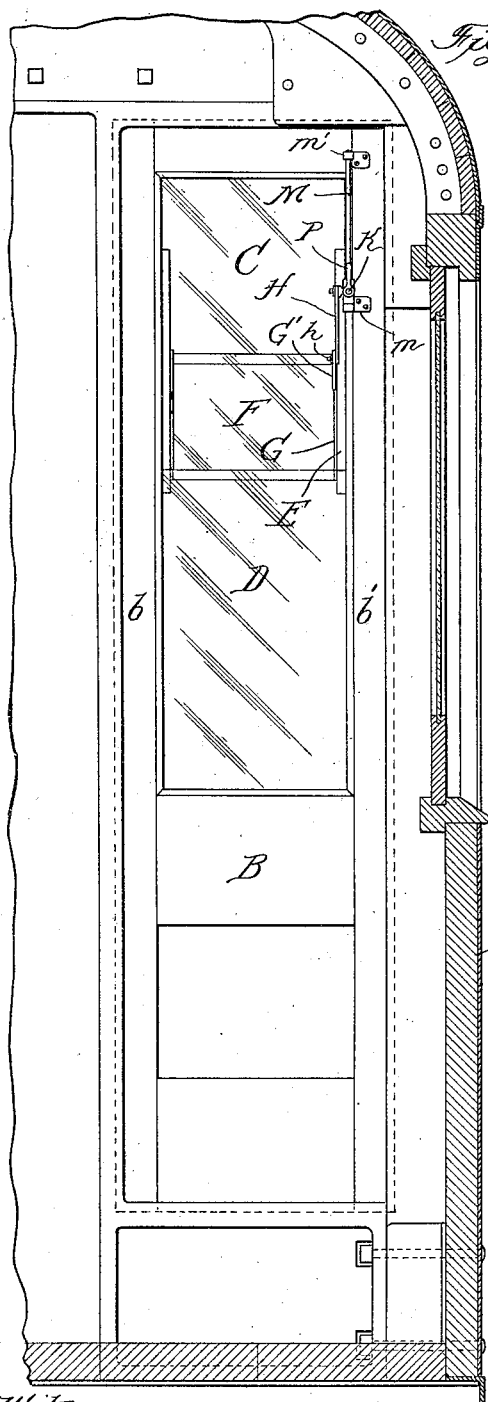
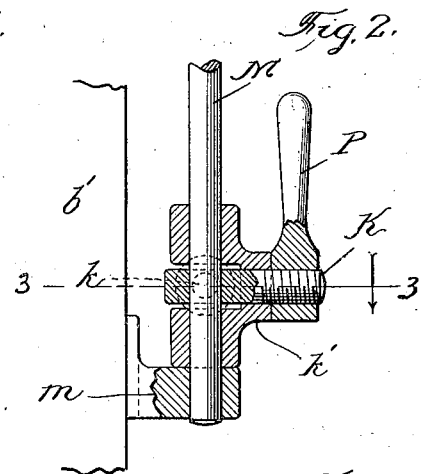
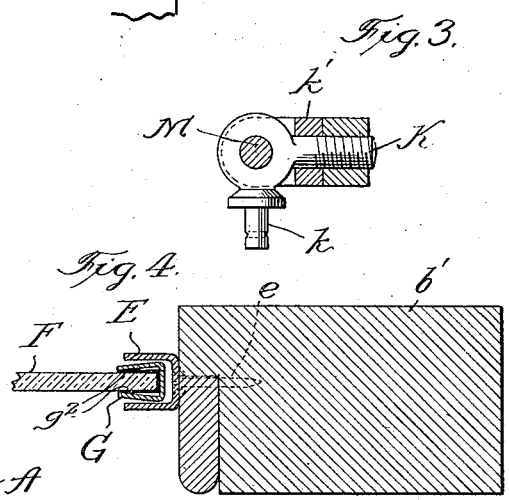
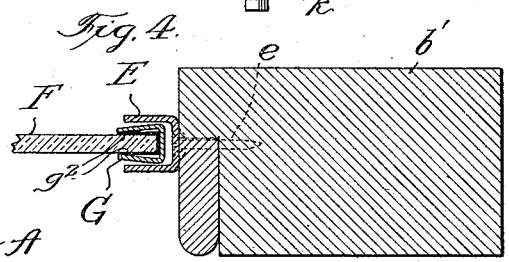
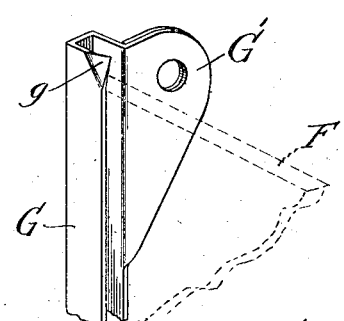

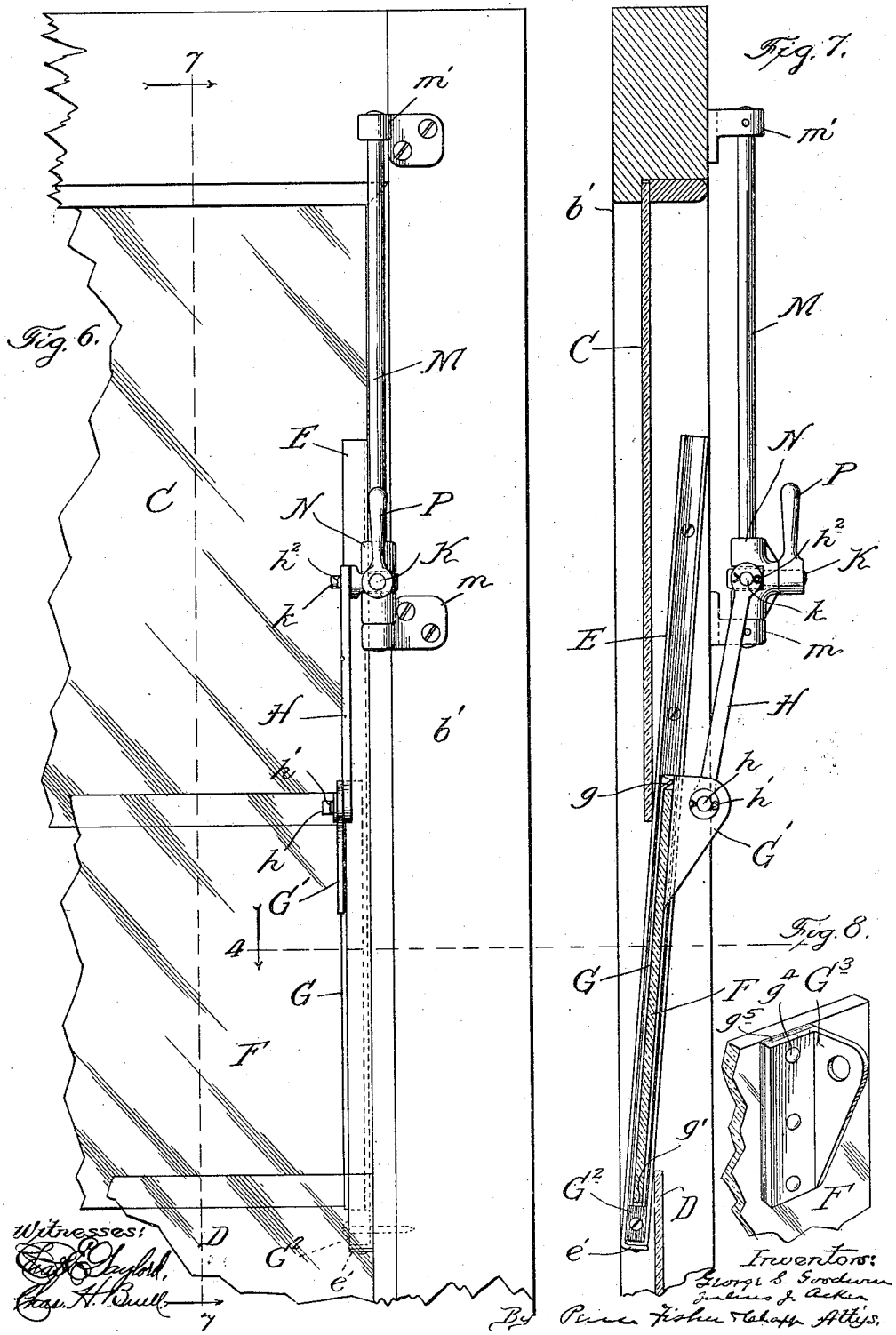

GEORGE S. GOODWIN AND JULIUS J. ACKER, OF CHICAGO, ILLINOIS.

CLEAR-VISION WINDOW.

1,327,321.

Specification of Letters Patent.

Patented Jan. 6, 1920.

Application filed October 2, 1916. Serial No. 123,231.

*To all whom it may concern:*

Be it known that we, GEORGE S. GOODWIN and JULIUS J. ACKER, citizens of the United States, residing in Chicago, county of Cook, and State of Illinois, have invented certain new and useful Improvements in Clear-Vision Windows, of which we do declare the following to be a full, clear, and exact description, reference being had to the accompanying drawings, forming part of the specification.

In order that the engineer of the locomotive may have a clear view in case the windows in his cab (particularly the front windows) become covered with snow or sleet, it is now required that front cab windows shall be provided with openings and with movable glass plates by which said openings may be closed. Such windows are commonly termed clear vision windows and ordinarily comprise upper and lower panes of glass separated about five inches, the space between the upper and lower panes of glass being closed, when desired, by a plate of glass in a suitable frame hinged to the window frame so that it may be readily adjusted from inside of the cab. In practice, various objections are found to the clear vision windows in which the movable glass pane is hinged as above described, and it is to overcome such objections and to provide a safe, effective, simple and inexpensive construction of clear vision window that our present invention is primarily designed. The novel features of the invention are hereinafter described, illustrated in the accompanying drawings, and particularly pointed out in the claims at the end of this specification.

Figure 1 is a view in vertical section showing one side of a locomotive cab, the front door of the cab being provided with our clear vision window, our improved window being shown in elevation. Fig. 2 is an enlarged detail view of the part of the mechanism for adjusting the window. Fig. 3 is a plan view with parts shown in cross section on line 3—3 of Fig. 2. Fig. 4 is a view in cross section on line 4—4 of Fig. 6. Fig. 5 is a perspective view showing the upper portion of one of the edge plates of the movable glass. Fig. 6 is an elevation showing a portion of the upper part of a cab door having our invention applied thereto. Fig. 7 is a view in vertical section on line 7—7 of Fig. 6. Fig. 8 is a detail showing a modified manner of connecting the movable glass to its shifting mechanism.

A designates the side wall of a locomotive cab and B designates one of the front doors of the cab. The frame and lower portion of the door B may be formed, as usual, of wood. Within the upper part of the door frame are mounted an upper glass C and a lower glass D, the upper and lower glasses C and D being rigidly held in place in the usual or any convenient manner and being separated about five inches apart, so that in case of snow or sleet covering the outer surfaces of the glasses C and D, a clear vision may be had through the open space between these glasses.

To the inner edge of the side stiles $b$ and $b'$ of the cab door are attached suitable guides E adapted to receive and guide the edges of a vertically movable glass F that is provided with means whereby it may be raised and lowered as the space between the glasses C and D is to be left open, or wholly or partially closed by the movable glass F. Preferably, the guides E are formed as U-shaped metal channels conveniently attached to the stiles $b$ and $b'$ of the door frame, as by screws $e$. These guide channels E, as clearly shown in Fig. 7 of the drawings, are preferably inclined from the vertical and extend downwardly and outwardly from a point inside the lower edge of the upper glass C to a point outside the upper edge of the lower glass D. To each side edge of the movable glass F is attached a channel plate or metal strip G, so that when these strips or plates G are in position upon the side edges of the glass F, the glass will slide freely within the guide channels E. Preferably the upper and lower ends of the channels G have inwardly turned portions $g$ and $g'$ that serve to snugly retain the plate of glass F within the channels G. The inwardly turned portion $g$ at the top of the channel G is shown as formed by simply bending over one corner of the channel, but the inwardly turned portion $g'$ at the bottom of the channel is preferably formed by bending at right angles to the channel the lower end of one of its walls. By preference, the U-shaped strips or channels G are made somewhat larger than the thickness of the plate of glass which they are intended to receive, the object of this being to permit a strip of felt, rubber or like material $g^2$ to be placed within the strips or channels G and around the edge of the glass; and the strips or channels G being formed of flexible material, such as comparatively thin sheet metal, the edges of the channels can be crimped inward so as to cause them to snugly hold the panes of glass of any thickness. If desired, rubber or felt blocks G² may be placed in the bottoms of the guide channels E to cushion the movable glass F. The lower ends of the channels E are turned inward at e' and riveted, as shown in Fig. 7 of the drawing. At the upper end of one of the channels G there is provided an offset arm G' that may be formed integral with the channel G or may be made separate and attached thereto. In this arm G' is a hole through which passes a stud $h$ on the lower end of a link or bar H, the stud being conveniently held in position with respect to the arm G' by means of a cotter-pin $h'$. The upper end of the link or bar H is formed with an eye that sets over a stud or trunnion $k$ formed on the side of an eye-bolt K, the arm H being conveniently held in position upon the stud $k$ by means of a cotter-pin $h^2$. The eye-bolt K encircles the vertically disposed guide rod or rail M, the lower and upper ends of which are fixed in brackets $m$ and $m'$ that are secured to the frame of the door B on one side of the door. The eye-bolt K passes through a block or casting N that is slidably mounted upon the rod or rail M, this casting being recessed to receive the eye-bolt, as clearly shown in Fig. 2 of the drawings. Upon the threaded outer end of the eye-bolt K is mounted an interiorly threaded hand-lever P, the inner face of which is adapted to bear against the outer end of a projecting portion $k'$ of the block N, as clearly shown in Fig. 2.

From the construction above defined, the operation of the parts will be seen to be as follows: When the movable glass F is in the closed position shown in the drawings, the lower edge of this movable glass extends outwardly over and in close relation to the upper edge of the lower glass D, while the upper portion of the movable glass F extends inside of and in close relation to the lower edge of the upper glass C; and when the movable glass F is thus closed, it will exclude air, rain or the like, while at the same time permitting to the engineer a perfectly clear and unobstructed vision through the window from top to bottom. The inclined arrangement of the movable glass and its overlapping the upper edge of the lower glass insures a perfect shedding of the water, since no cracks are exposed through which rain may drive.

When it is desired to raise the movable glass F, the hand lever P is turned slightly so as to release the binding of the eye-bolt K on the rod or rail M, after which the hand lever P with the slide block N can be slid upwardly along the rail M carrying with it the link or bar H and the movable glass F. The movable glass F when raised to any desired height can be held in such position by merely turning the hand-lever P so as to cause the eye-bolt K to firmly bind upon the rail M. By this means, the space between the upper glass C and lower glass D may be held open to any desired extent.

Our present invention while susceptible of use in other situations, is especially advantageous when applied to the windows of locomotive cab doors. In applying the invention to existing locomotives, no cutting of the cab door frame is necessary,—as is required with most other types of clear vision windows,—it being simply required that the upper and lower glasses C and D shall be separated the required distance. Inasmuch as the movable glass F is arranged to slide in approximately vertical direction and within the line of the door frame, the clearance or open space of the doorway is not obstructed. This is a feature that contributes materially to safety, as it enables the quick egress of the engine men in case of necessity. Furthermore, the movable glass is not liable to be broken by projecting beyond the door, as the case when such movable glass is mounted to swing outwardly in a hinged frame. Moreover, by mounting the movable glass in manner shown, the parts are much stronger and better adapted to resist the action of the wind than is the case where such glass is carried by a hinged frame. So, also, with our invention, the movable glass can be readily replaced in case of breakage, it only being necessary to bend the clip $g$ in order to insert a new plate of glass in place of the broken one.

Another valuable feature of the invention is that no metallic connection is necessary between the channel strips at the side edges of the movable glass, so that a set of these strips may be used for any width of glass.

Obviously, the precise details above set out may be varied without departing from the spirit of the invention and features of the invention may be employed without its adoption as an entirety.

Thus, for example, the channel strips $g$ may be omitted altogether, and in such case, as shown in Fig. 8, the arm G³ may be attached to the movable glass F by means of rivets $g^4$ that pass through the angular inner portion of the arm G³ and through the glass, a sheet of felt or like material $g^5$ being interposed between the arm G³ and the glass F.

Having thus described our invention, what we claim as new and desire to secure by Letters Patent is—

1. A clear vision window comprising a frame, a fixed glass in said frame having an unobstructed horizontal edge adjacent an opening within said frame, a vertically movable glass adapted to bridge said opening and having an unobstructed horizontal edge opposite the unobstructed edge of said fixed glass, U-shaped metal guides attached to said frame and within which the vertical edges of said movable glass may slide, said guides being inclined downwardly and outwardly to guide said movable glass across the vertical plane of said fixed glass, and means connected to said movable glass for shifting it and holding it in adjusted position.

2. A clear vision window comprising a frame, a fixed glass in said frame having an unobstructed horizontal edge adjacent an opening within said frame, a vertically slidable glass adapted to bridge said opening, said glass being inclined downwardly and outwardly and having an unobstructed horizontal edge opposite the unobstructed edge of said fixed glass, diagonally arranged guides attached to said frame and within which the vertical edges of said slidable glass may move, channel-shaped metal strips attached to the vertical edges of said slidable glass, one of said strips being provided with an inwardly projecting arm, a stationary, vertical guide rod fixed to the inner side of said frame adjacent said inwardly projecting arm, a block mounted to slide upon said stationary rod, an eye-bolt encircling said rod and engaging said block, a link pivotally connected at one end with said projecting arm and at its opposite end with said eye-bolt, and a hand lever engaging said eye-bolt and whereby said sliding block may be shifted and held in different adjusted positions.

GEORGE S. GOODWIN.
JULIUS J. ACKER.